US008219975B2

(12) United States Patent
Goossen et al.

(10) Patent No.: US 8,219,975 B2
(45) Date of Patent: Jul. 10, 2012

(54) REAL-TIME ANALYSIS OF PERFORMANCE DATA OF A VIDEO GAME

(75) Inventors: Andrew Goossen, Issaquah, WA (US); Parham Mohadjer, Redmond, WA (US); Matthew Kimball, Seattle, WA (US); John Howard Palevich, Medina, WA (US); Juan Carlos Arevalo Baeza, Bellevue, WA (US); Jason Matthew Gould, Woodinville, WA (US); Matthew Lee, Redmond, WA (US); Michael Burrows, Sammamish, WA (US); Karen Elaine Stevens, Woodinville, WA (US); David Aronson, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 1151 days.

(21) Appl. No.: 11/925,226

(22) Filed: Oct. 26, 2007

(65) Prior Publication Data

US 2009/0113251 A1 Apr. 30, 2009

(51) Int. Cl.
*G06F 9/44* (2006.01)

(52) U.S. Cl. ........... 717/122; 717/127; 717/131; 714/46

(58) Field of Classification Search .......... 717/124–135; 345/506, 639
See application file for complete search history.

(56) References Cited

U.S. PATENT DOCUMENTS

| | | | |
|---|---|---|---|
| 5,522,036 A | 5/1996 | Shapiro | 395/183.14 |
| 6,381,604 B1 * | 4/2002 | Caughran et al. | 1/1 |
| 6,862,027 B2 | 3/2005 | Andrews et al. | 345/505 |
| 7,095,416 B1 | 8/2006 | Johns et al. | 345/522 |
| 7,506,305 B2 * | 3/2009 | Cornelius et al. | 717/113 |
| 7,533,371 B1 * | 5/2009 | Johns et al. | 717/130 |
| 7,950,004 B2 * | 5/2011 | Vieira et al. | 717/125 |
| 2003/0046663 A1 * | 3/2003 | Rogers et al. | 717/125 |
| 2004/0034847 A1 * | 2/2004 | Joffrain et al. | 717/113 |
| 2004/0107415 A1 * | 6/2004 | Melamed et al. | 717/124 |
| 2005/0071818 A1 | 3/2005 | Reissman et al. | 717/127 |
| 2005/0081104 A1 * | 4/2005 | Nikolik | 714/38 |
| 2006/0253739 A1 | 11/2006 | Godefroid et al. | 714/38 |
| 2006/0281535 A1 | 12/2006 | Bogan | 463/23 |
| 2007/0038977 A1 * | 2/2007 | Savage | 717/106 |
| 2007/0040939 A1 | 2/2007 | Anderson et al. | 348/500 |
| 2007/0082741 A1 | 4/2007 | Xu | 463/43 |

OTHER PUBLICATIONS

JC Yan et al., Analyzing parallel program performance using normalized performance indices and trace transformation techniques; Parallel Computing, 1996—Elsevier; pp. 1215-1237.*
JK Hollingsworth et al., Dynamic program instrumentation for scalable performance tools; 1994—ieeexplore.ieee.org; pp. 1-10.*
Bowdidge, R.W., "Refactoring gcc Using Structure Field Access Traces and Concept Analysis", *Workshop on Dynamic Analysis*, 2005, 1-7, http://delivery.acm.org.
Nimmer, J.W. et al., "Automatic Generation of Program Specifications", *ACM*, 2002, 229-239.

(Continued)

*Primary Examiner* — Wei Zhen
*Assistant Examiner* — Satish Rampuria
(74) *Attorney, Agent, or Firm* — Woodcock Washburn LLP

(57) ABSTRACT

A method for analyzing the performance of a video game uses a diagnostic tool that is associated with application code of the video game. The diagnostic tool is activated when the video game is in operation, and real-time performance data is captured and displayed. A warning is generated when a performance metric violates a pre-set condition. The warning may be displayed on a display screen that is used to provide information for rectifying the violation.

12 Claims, 12 Drawing Sheets

OTHER PUBLICATIONS

Verdesca, M. et al., "Using Graphics Processor Units to Accelerate OneSAF: A Case Study in Technology Transition", *Interservice/Industry Training, Simulation, and Education Conference*, 2005, 10 pages, http://gamma.cs.unc.edu.

* cited by examiner

| Dr. PIX Monitor | | | | |
|---|---|---|---|---|
| Warning | Pri | Warnings | | Last Frame |
| Too many D3D locks | 1 | Save | | 326 |
| Too many debug prints | 2 | Time Mode | | 433 |
| Too long a frame | 2 | | 6 | 248 |
| Frame Range | 245 | to | 442 | |
| Clear | | | | Start |

| Dr. PIX Monitor | | | | |
|---|---|---|---|---|
| Warning | Pri | Warnings | | Last Frame |
| Too many D3D locks | 1 | Save | | 326 |
| Too many debug prints | 2 | Time Mode | | 433 |
| Too long a frame | 2 | | 6 | 248 |
| Time Range | | 1.0s | to | 2.0s |
| Clear | | | | Start |

REAL-TIME ANALYSIS OF PERFORMANCE DATA OF A VIDEO GAME

TECHNICAL FIELD

The technical field relates generally to gaming applications and specifically relates to real-time analysis of performance data of a video game.

BACKGROUND

Analyzing the performance of a video game is traditionally carried out by collecting data when the game is in operation, halting the game, and then analyzing the collected data offline. As can be appreciated, this procedure is often a hit-or-miss affair because the captured data may or may not contain information pertaining to an intermittently-occurring problem or to a problem of a subtle nature.

Furthermore, the offline analysis process generally involves a collective effort from a team of software developers each having an individual area of expertise. For example, in such a team, a first developer may be an expert on system libraries, a second on databases, and a third on the correct sequence of coding events that need to occur for successful operation of a particular video game. This type of team composition is necessary because traditional analysis and debugging tools often generate cues (such as esoteric and cryptic warning/failure messages) that only an expert can understand. Consequently, this environment does not readily accommodate debugging efforts being carried out by a one-person team when this person has a generalized knowledge of gaming and/or software, or even when this person is an expert in just one particular area of gaming and/or software.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

In one exemplary method for analyzing the performance of a video game, a diagnostic tool is associated with at least some portion of an application code that is used to execute the video game. The diagnostic tool is activated when the video game is in operation, and real-time performance data is captured and displayed. A warning is generated when a performance metric violates a pre-set condition. The warning may be displayed on a display screen that is used to provide information for rectifying the violation.

Furthermore, an exemplary system for analyzing the performance of a video game includes a computer-readable storage medium on which is stored a diagnostic tool for capturing real-time performance data when the video game is in operation. The system further includes a display unit configured to provide a diagnostics display window for displaying a description and data statistics of a performance metric violation associated with the real-time performance data.

BRIEF DESCRIPTION OF THE DRAWINGS

The foregoing summary, as well as the following detailed description, is better understood when read in conjunction with the appended drawings. For the purpose of illustrating real-time analysis of performance data of a video game, there is shown in the drawings exemplary constructions thereof; however, real-time analysis of performance data of a video game is not limited to the specific methods and instrumentalities disclosed.

FIG. 5 shows an activation status on a second menu item of the drop-down menu of the diagnostics display window.

FIG. 6 shows a view of the warnings display window with a time range indicator display in response to activation of the menu item as shown in FIG. 5.

DETAILED DESCRIPTION OF ILLUSTRATIVE EMBODIMENTS

The following description provides details pertaining to analyzing the performance of a video game by capturing real-time performance data and generating, during this data capture, a real-time warning when a monitored parameter falls outside a pre-determined threshold. Consequently, performance issues that may be of an intermittent nature or not detectable in a non-real-time analysis process are uncovered. Furthermore, upon obtaining a warning, a developer can obtain further particulars of the warning and a recommendation for carrying out remedial action.

In one exemplary embodiment, the warning is provided in the form of a diagnostics display window containing warning labels. Each of the warning labels is configured as a soft-key that may be activated to display a pointer icon that points to a particular frame in a sequence of frames that is displayed in a graphical format in a system monitor window. When the warning label is further activated, by double-clicking on it for example, a description window appears. The description window provides details of the warning and also provides a recommended course of action for rectifying the problem.

Figure 1:
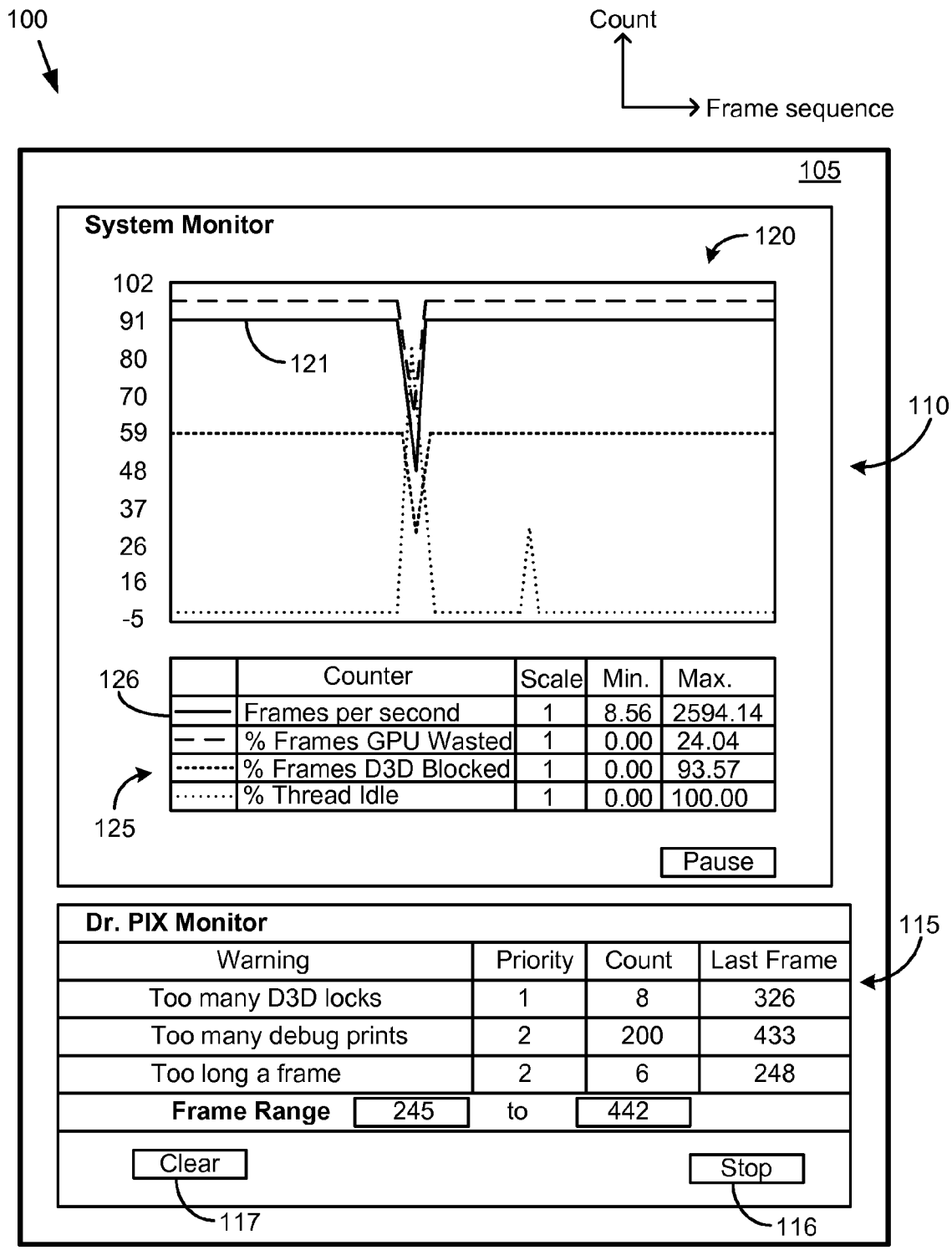
FIG. 1 shows an exemplary display screen of a system for analyzing the performance of a video game, the display screen including a diagnostics display window.

FIG. 1 shows an exemplary display screen 105 that is a part of a performance analyzer system 100 for analyzing the performance of a video game. Performance analyzer system 100 has been branded as "Dr. PIX" by Microsoft® and it will be understood that any use of the term Dr. PIX, herein in this document, is being merely being done for purposes of convenience. Other trade names may be alternatively applied to a performance analyzer system that incorporates the features described herein in this document. Similarly, reference is made herein to "D3D," which refers to a Microsoft development tool named "Direct3D." This tool is generally known to persons of skill in this art, and will, therefore, not be elaborated upon in much detail.

Display screen 105 may be implemented in a variety of different formats. For example, in one implementation, display screen 105 uses a windows format in accordance with Microsoft Windows®. However, in other implementations, other types of displays and display formats may be used. The exemplary display screen 105 of FIG. 1 shows a system monitor display window 110 and a diagnostics display window 115 (labeled as Dr. PIX Monitor).

System monitor display window 110, hereinafter referred to as system monitor 110, provides a graphical display 120 of gaming performance in terms of data statistics captured over a sequence of video gaming frames. In one example, the data statistics is a count value pertaining to the number of occurrences of a monitored gaming parameter such as, for example, D3D locks. Consequently, the number of D3D locks occurring on a real-time frame-by-frame basis can be seen in system monitor 110. It will be understood that various gaming parameters can be selected for monitoring, together with selectable priority levels and other performance metrics. A few non-exhaustive examples of gaming parameters include: redundant states, number of thread switches in a kernel, sleep time, ratio of bytes read to number of requests.

Below the graphics display 120 of monitor display window 110, is a tabular display 125 that provides numerical information pertaining to the various graphs displayed in graphical display 120. The first column of tabular display 125 identifies a particular graph. In the illustration of FIG. 1, the graphs have been identified by various types of lines such as solid, dashed and dotted lines. However, this format has been utilized merely for ease of description. In a practical set-up, each of the graphs may be identified by a unique color and each of the colors is identified in the first column of tabular display 125. For example, graph 121 (which is identified in FIG. 1 using a solid line), may be identified by a red color and cell 126 of the first column of tabular display 125 would be shaded red correspondingly. Other identification means may be similarly used for identifying the individual graphs.

The second column of tabular display 125 provides list of performance metrics associated with various monitored parameters. In this exemplary embodiment, the entries in the second column correspond to various counters that are used to obtain count values of certain performance metrics that are used to analyze the performance of the video game. The counters may be provided to correspond to a set of pre-determined performance metrics that are selected by a manufacturer of performance analyzer system 100. Alternatively, performance analyzer system 100 may be configured to permit a developer or other individual to define one or more counters for various performance metrics that are of particular interest to the developer.

The third column of tabular display 125 lists the scaling factors for each of the graphs of graphics display 120, while the fourth and fifth columns provide minimum and maximum values of the corresponding monitored parameters.

Additionally, performance analyzer system 100 may include a data store (not shown), which is used for storing a running log of timing parameters related to the monitored gaming parameters. Consequently, when a developer notices an abnormal spike, for example, in a particular frame on graphical display 120, the stored data may be accessed for carrying out a timing analysis on the abnormal frame.

Diagnostics display window 115 (Dr. PIX Monitor) provides data statistics pertaining to the monitored gaming parameters, and specifically provides data related to one or more monitored parameters that fall outside a pre-determined threshold. In the exemplary view shown in FIG. 1, a first column of diagnostics display window 115 lists warnings related to the monitored parameters. The first warning indicates "too many D3D locks," while the second warning indicates "too many debug prints." The second column of diagnostics display window 115 lists the priority level of each of the warnings of column 1. The priority levels may be pre-determined by a manufacturer of performance analyzer system 100, or may be selectably set by a game developer or other user of performance analyzer system 100. The third column of diagnostics display window 115 lists the count value for each of the warnings of column 1, while the fourth column provides frame information of where the warning occurred in the sequence of frames displayed in graphical display 120.

Diagnostics display window 115, as well as system monitor 110 may include soft-keys for carrying out various operations such as, for example, Pause, Stop, Print, Store, Ignore, Hide, Edit, and Clear. While the functionality of some of these soft-keys is self-evident, it may be pertinent to point out certain features in some others. The Save key (not shown) is used to save the warnings in a database or file; the Ignore key (not shown) is used to selectively ignore certain warnings; the Hide key (not shown) is used to hide diagnostics display window 115; the Edit key (not shown) to edit the warning conditions so as to make them visible or invisible; and the Clear key (soft-key 117) is used to clear the contents of diagnostics display window 115. The Stop key (soft-key 116) will be described below in further detail.

Furthermore, each of the cells in tabular display 125 and/or diagnostics display window 115 may be configured in various ways. For example, a cell may be configured as a soft-key, which when activated, leads to a further operation such as providing an additional display. A cell may be further configured to be editable, whereby for example, the text content may be modified or a numerical parameter set to a desired value.

Figure 2:
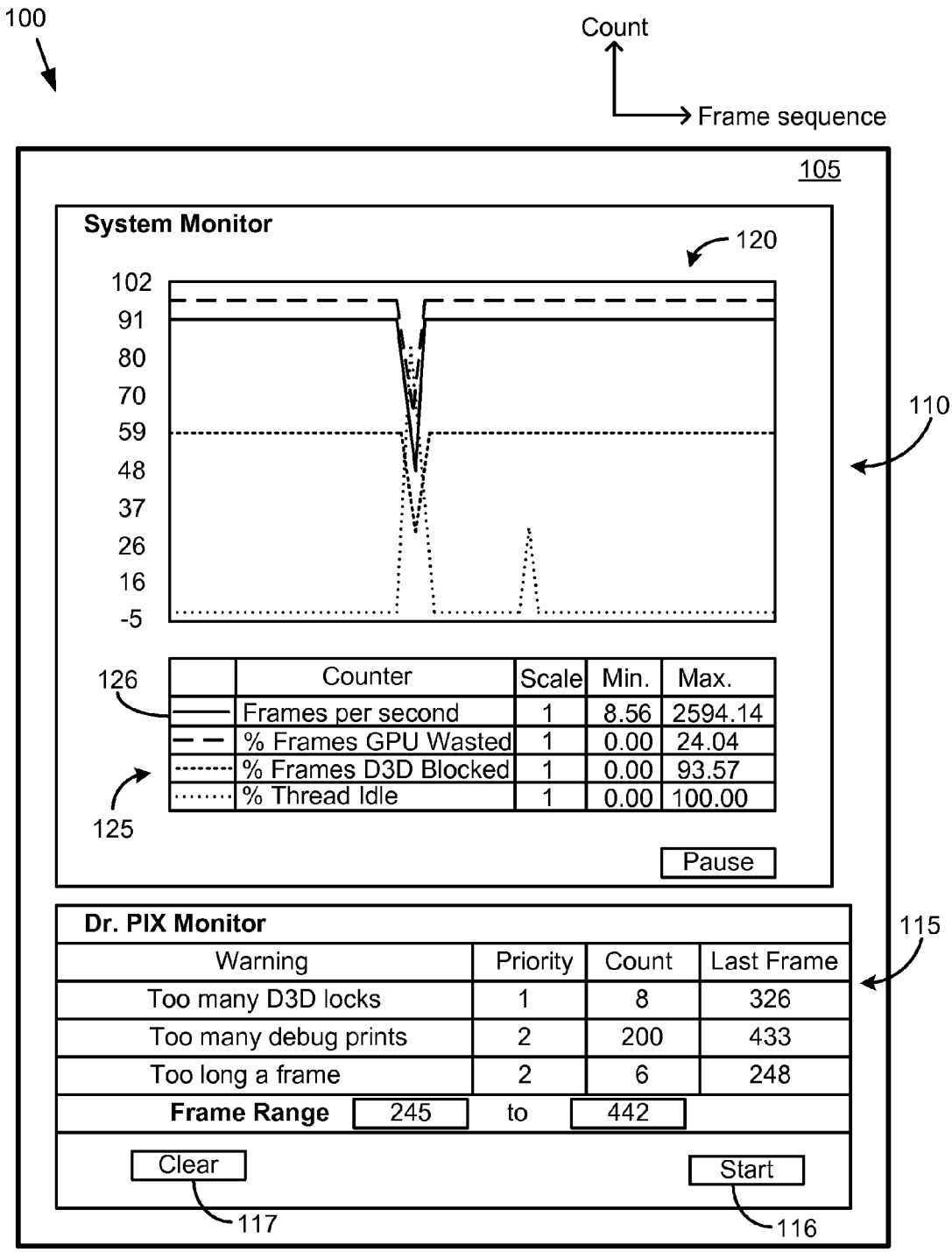
FIG. 2 shows an exemplary view of the diagnostics display window of FIG. 1, in one operational display mode.

FIG. 2 shows an exemplary view of diagnostics display window 115 when a soft-key of diagnostics display window 115 has been activated. In this particular example, soft-key 116, which was labeled "Stop" in FIG. 1, was activated thereby causing the soft-key to be re-labeled as "Start." Upon activation of the "Stop" function, the contents of diagnostics display window 115 are frozen so that a developer can examine and analyze the displayed values. After having done so, the developer can now activate the "Start" key to resume display activities in diagnostics display window 115.

Figure 3:
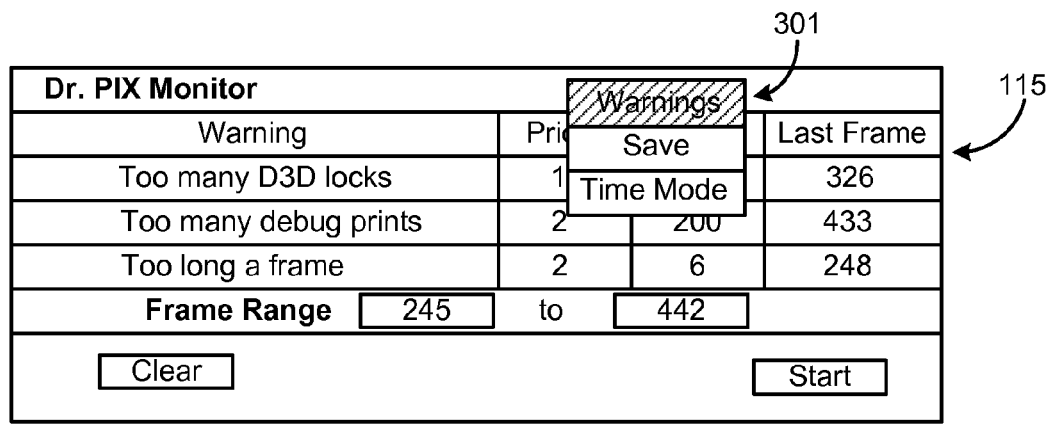
FIG. 3 shows a drop-down menu on the diagnostics display window of FIG. 2 with one of the menu items showing an activation status.
Figure 4A:
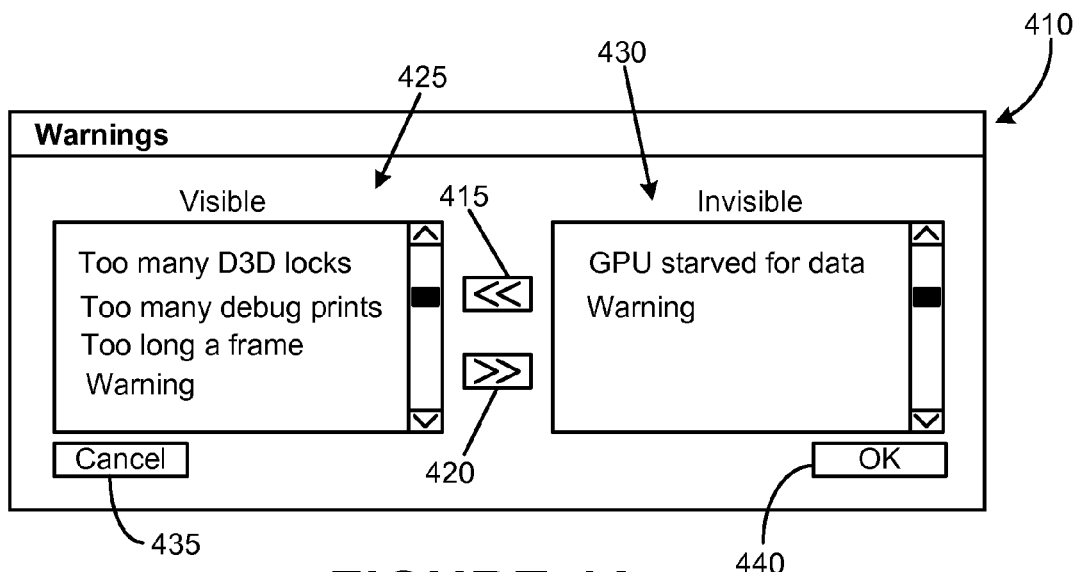
FIG. 4A shows a warnings display window that is a result of the activation on the drop-down menu of FIG. 3.

FIG. 3 shows an exemplary embodiment where a drop-down menu 301 is provided in conjunction with diagnostics display window 115. As can be understood, the functionality of drop-down menu 301 may be implemented in other alternative ways, such as, for example, by using selection icons or soft-keys. In this example, drop-down menu 301 contains three options: Warnings, Save, and Time Mode. The hatched format of the Warnings option is intended to indicate that this option has been selected. When thus selected, the Warnings window 410 of FIG. 4A is displayed. Warnings window 410 provides a list of Visible warnings in display box 425 and a list of Invisible warnings in display box 430. Action soft-keys 415 and 420 permit transfer of warnings between display box 425 and display box 430 thereby permitting selection of the visibility status of individual warnings. For example, the warning labeled "Too many D3D locks" may be made invisible by selecting this warning (for example, by clicking on it), followed by activation of soft-key 420. Each of the display boxes 425 and 430 may incorporate additional features such as a scroll-bar. Warnings window 410 provides additional soft-keys such as, for example, Cancel soft-key 435 and OK soft-key 440.

Figure 4B:
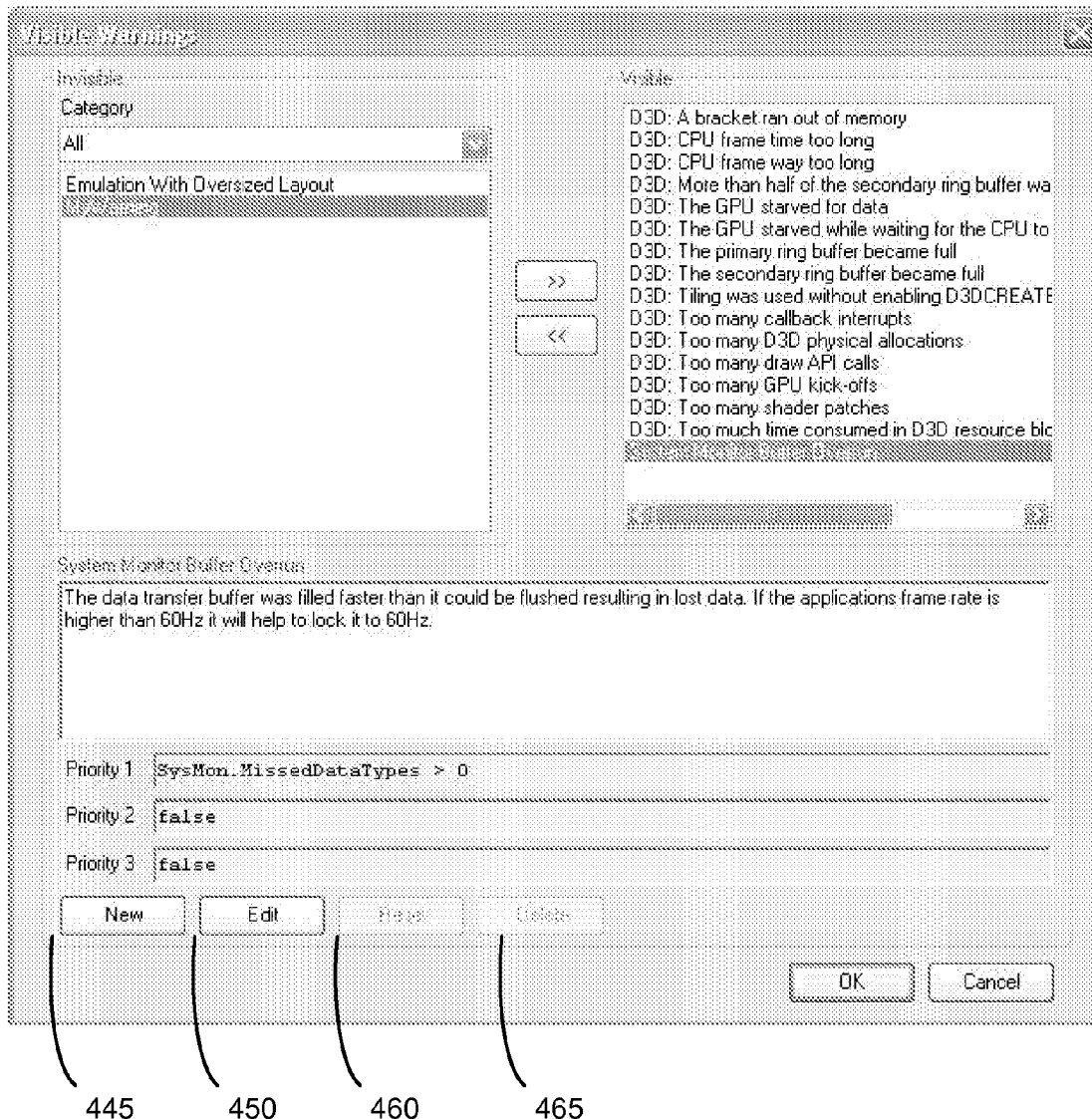
FIG. 4B shows another example warning display window.
Figure 4C:
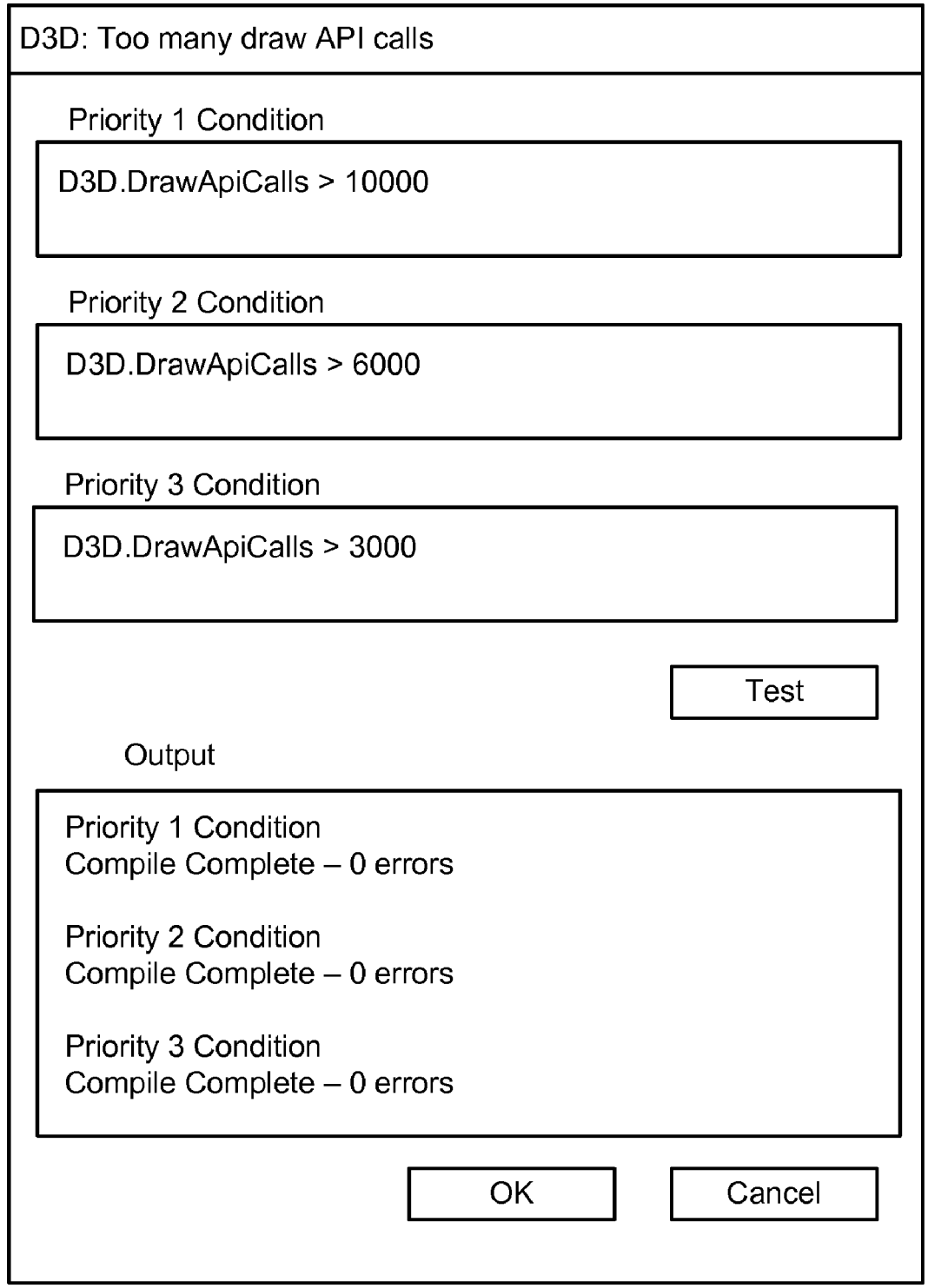
FIG. 4C shows another example warning display window wherein a user can generate a tailored warning.

FIG. 4B illustrates other example appropriate invisible and visible warnings. Also, as depicted in FIG. 4B, warning conditions are fully editable. A user can create a warning based on any of the supplied counter values. This allows for an advanced user to go outside of predefined settings and evaluate tailored data combinations. Warnings can be tested in a dialog prior to use, allowing the user to ensure correct expected behavior. As depicted in FIG. 4B, a user can generate a new warning via soft-key 445, a user can edit an existing warning via soft-key 450, a user can reset a warning via soft-key 460, a user can delete a warning via soft-key 465, or a combination thereof. Warnings can be added and removed by moving them between the invisible and visible list. A user can set conditions and test if the conditions are technically correct before saving the warnings. If the conditions are not correct, an error will be generated. For example, referring to FIG. 4C, suppose a user forgets to include the ">10000" portion shown in the Priority 1 Condition window of FIG. 4C. Instead, suppose the user enters "D3D.DrawApiCalls" in the Priority 1 Condition window. When testing the condition, an error will be generated. The generated error will be "Priority 1 Condition—error CS0029: Cannot implicitly convert type 'float' to 'bool'" (Error not shown in FIG. 4C). The conditions and errors are based on C++/C # conditional logic.

FIG. 5 shows a hatched format of the Time mode option in drop-down menu 301, indicative of selection of this option. When thus selected, as depicted in FIG. 6, the frame range changes to time range. In an example embodiment, the time range displayed in Time Range display segment 615 (1.0 seconds to 2.0 seconds in this example) provides a time window within which warnings can be observed. Thus, the ability is provided to show warnings that were generated within a selected range of time.

Figure 7A:
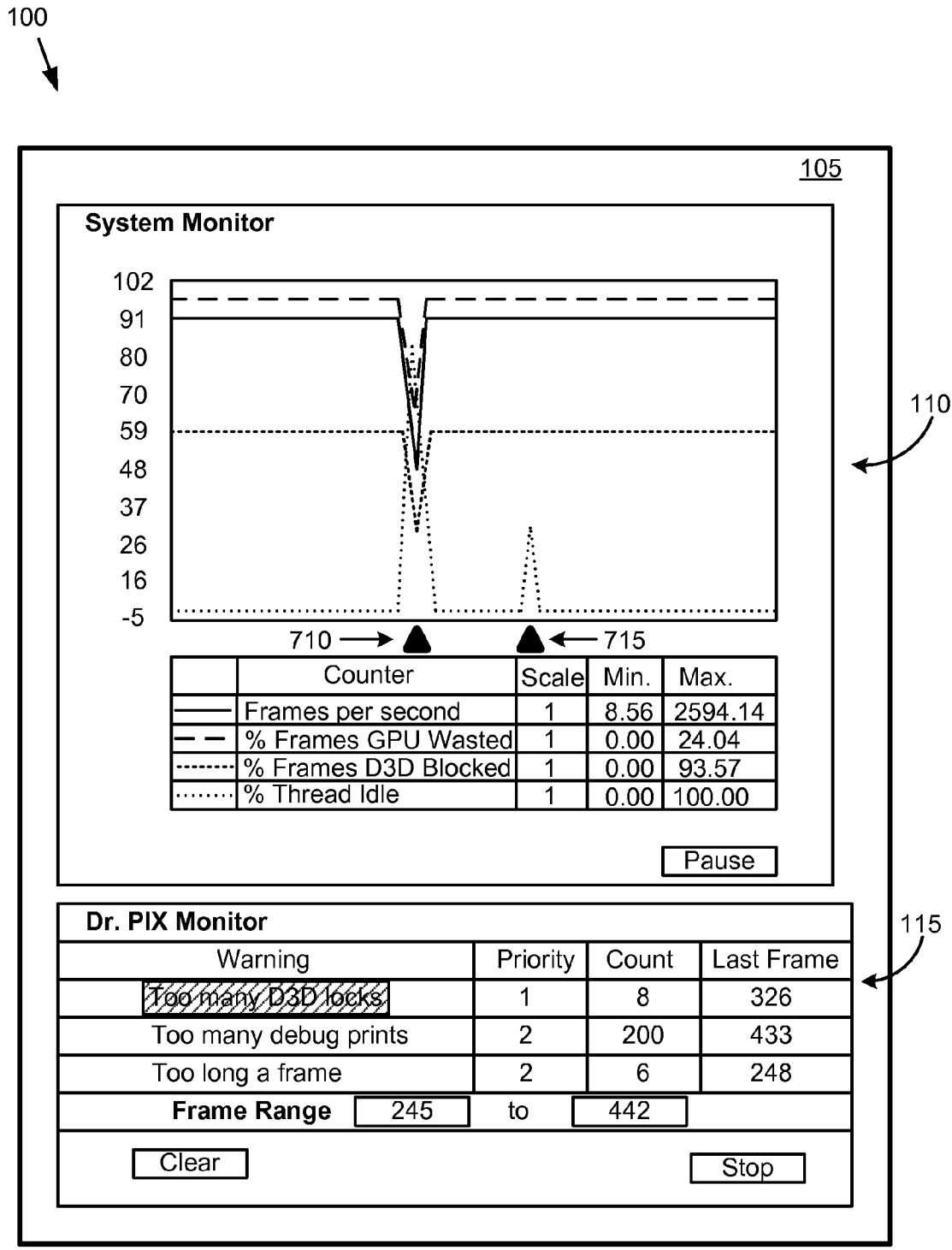
FIG. 7A shows a selection status carried out upon one of the items in the diagnostics display window.
Figure 7B:
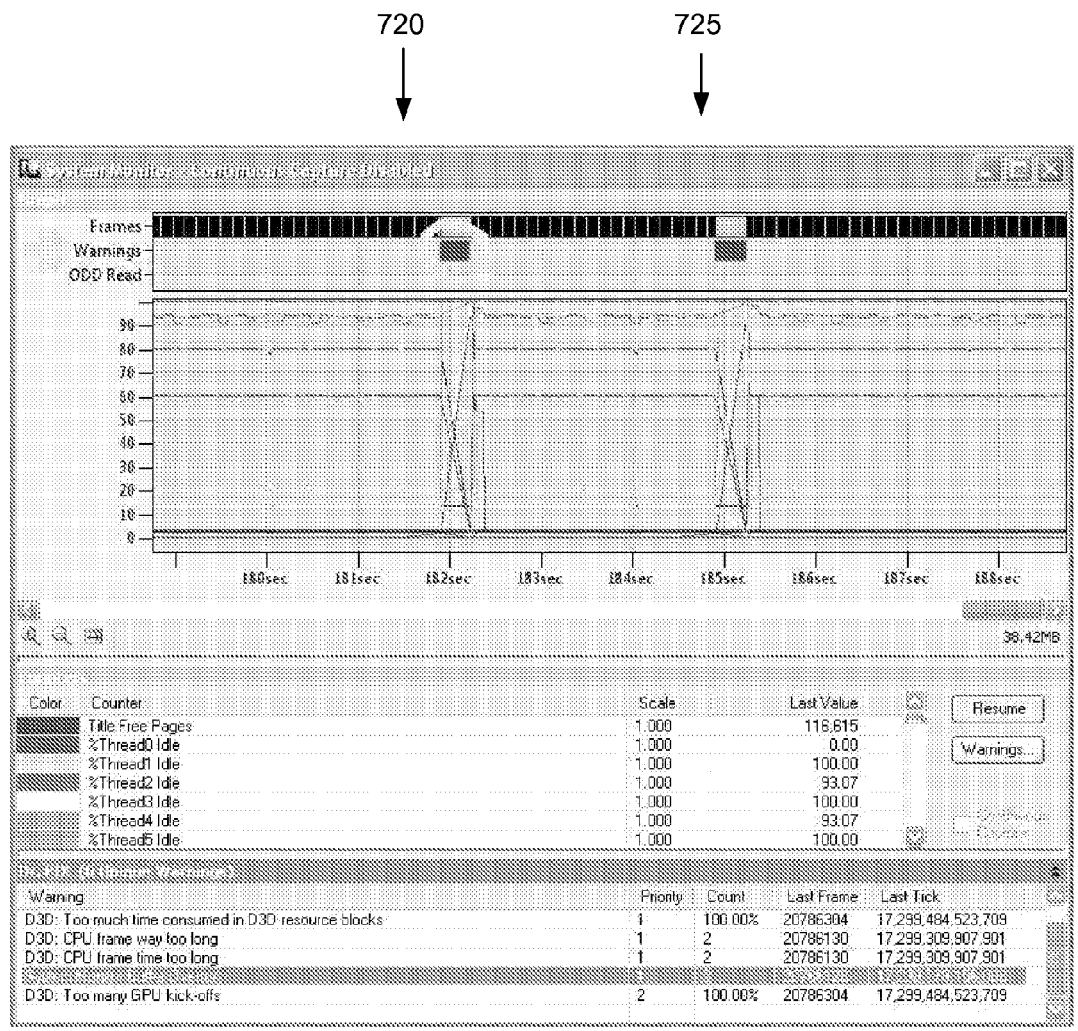
FIG. 7B shows another example of a selection status carried out upon one of the items in the diagnostics display window.

FIG. 7A shows an exemplary view of display screen 105 to describe operation of a soft-key process associated with each of the warning messages in diagnostics display window 115. In this particular example, the hatched portion indicates that the "Too many D3D locks" warning has been activated using a first mode of activation (by single-clicking on the warning, for example). When thus activated, one or more pointer icons are displayed pointing to certain frames on graphical display 120. In this exemplary illustration, two pointer icons 710 and 715 are displayed. The pointer icons are used to identify the one or more frames where the warning was generated. In another example embodiment, as depicted in FIG. 7B, the actual time duration that a warning was active is shown in an event band at the top of the display. This is depicted as track that has a solid bar, as depicted by bars 720 and 725, for the period the warning was evaluated to be true. In an example embodiment, the color of the bar signifies the priority of the warning.

Figure 8:
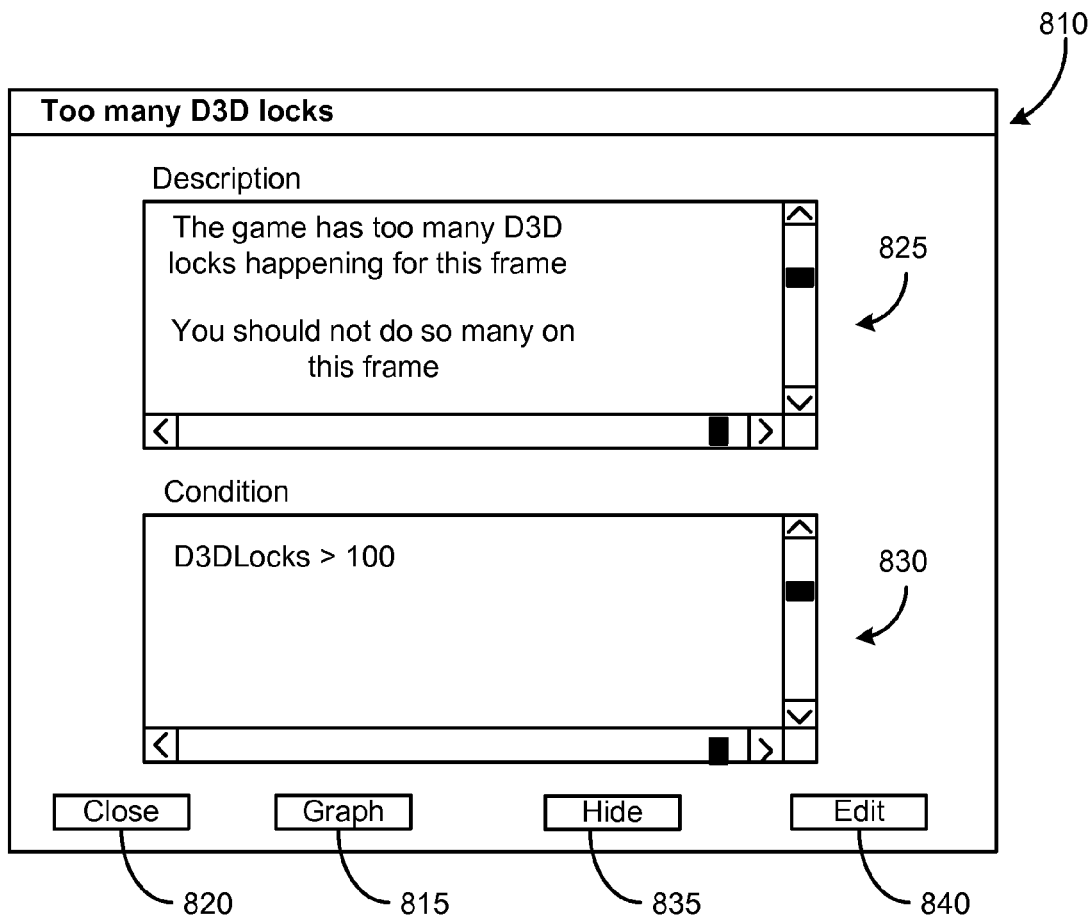
FIG. 8 shows a description window containing information pertaining to the item that was selected as shown in FIG. 7.

The "Too many D3D locks" warning may be also activated using a second mode of activation (by double-clicking on it, for example). This form of activation results in the display of a description window for the warning. An exemplary description window 810 is shown in FIG. 8 for the warning "Too many D3D Locks." Description window 810 includes a condition section 830 where one or more conditions that led to the warning are displayed. Description window 810 further includes a description section 825 in which a description of the warning as well as other particulars of the warning is provided. Certain portions of the entries in either the condition section 830 and/or the description section 825 may be configured as soft-keys. For example, a portion (or entirety) of the admonishment "You should not do so many on this frame" may include a soft-key. In one embodiment, the soft-key is provided in a Hypertext Markup Language (HTML) format which can be activated to jump to a solution source. Such a solution source may be a private document, such as a user's manual, or a public document such as a web page that is accessed via the Internet, for example.

Furthermore, in one exemplary embodiment, clicking on a soft-key located in any portion of description window 810, for example, in description section 825, provides access to source code wherein the problem can be rectified. The source code is a part of the gaming application code of the video game.

In an example embodiment, description window 810 further contains a number of dedicated soft-keys, such as, for example, the soft-keys Close 820, Graph 815, Hide 835 and Edit 840. Clicking on Close 820 closes description window 810. Clicking on Hide 835 removes the warning from a warning window, such as warnings window 410 described above. Clicking on Graph 815 causes a warning graphical display (not shown) of the warning to appear. Clicking on the Edit 840 allows the user to edit the warning condition (See FIG. 4C). This warning graphical display may utilize a format similar to that of graphical display 120 described above. Each of the soft-keys may be also configured to change functionality when activated. For example, upon clicking on the Graph 815 key, the soft-key transforms to an "Ungraph" key, which permits the warning graphical display to be closed.

A non-exhaustive list of exemplary warnings, together with some information pertaining to each of these warnings and some recommended solutions, is provided below. Several warnings listed below, use a certain format for setting warning thresholds and priorities. This exemplary format will be described using the warning labeled: D3DShaderPatches>{2, 10, 50}. The numbers located within { } provide priority threshold warning values. In this particular example, the numbers located within { } indicate a priority level 1 warning setting when D3DShaderPatches>50; a priority level 2 warning setting when D3DShaderPatches>10; and a priority level 3 warning setting when D3DShaderPatches>2. It may also be pertinent to point out that these priority levels are shown in the second column of diagnostics display window 115 as described above.

D3D: Too Many Shader Patches
D3DShaderPatches>{2, 10, 50}

There were too many vertex shader patches. A vertex shader patch happens when a vertex shader is used with a different vertex declaration or SetStreamSource stride than it was previously used with, or when it's used with a pixel shader whose inputs don't match the vertex shader's outputs. Patches cause D3D to incur significant CPU overhead and waste GPU command space.

D3D: Too Many GPU Interrupts
D3DInterrupts>{40, 100, 200}

There were too many GPU interrupts. GPU interrupts are generated by calls to InsertCallback or EndTiling, EndZPass or XpsEnd. Interrupts incur significant CPU and GPU overhead.

D3D: Too Much Time Spent in Interrupt Callbacks
D3DCallbackTime>{0.5 ms, 1 ms, 2 ms}

There was too much cumulative time spent processing interrupt callbacks. This is most likely because InsertCallback routines took too long, or it might be due to other interrupt or DPC activity in the system. The GPU has to idle the entire time that interrupt callbacks are processed by the CPU.

D3DX: Too Many Run-Time Shader Compilations
D3DXShaderCompilations>{0, 5, 10}

There were too many run-time calls to D3DXCompileShader or its variants. Shader compilation has very high CPU overhead and requires significant amounts of dynamically allocated memory. It's preferable to precompile all shaders on the PC.

D3DX: Too Many D3DX Resource Creation Calls
D3DXCreationCalls>{0, 5, 10}

D3DX resource creation APIs such as D3DXCreateTextureFromFile have high CPU and disc overhead. It's preferable to convert resources on the PC to the 360 format (using functions such as XGCopySurface), pack multiple resources into a single file (so that a file doesn't have to be opened and closed for every resource), and then load efficiently onto the 360 (using functions such as XGSetTextureHeader).

D3D: Too Many D3D Resource Creation Calls
D3DCreationCalls>{0, 5, 10}

D3D resource creation APIs such as CreateTexture and CreateVertexBuffer have high CPU overhead because they have to allocate physical memory.

D3D: The Primary Ring Buffer was Overrun
D3DPrimaryRingBufferOverruns>{0, 0, 0}

D3D had to block because the primary ring buffer was overrun. This wastes CPU time for the duration of the block. This overrun can occur for reasons such as using Predicated Tiling with a large number of tiles, or when many 'kick-offs' of the GPU are being done (such as can be caused by frequently calling InsertFence).

Because the primary ring buffer is small, the simplest fix is to increase its size via D3DRING_ BUFFER_PARAMETERS.

D3D: Too Many Secondary Ring Buffer Overruns
D3DSecondaryRingBufferOverruns>{1, 2, 3}

D3D had to block because the secondary ring buffer was overrun. This wastes CPU time for the duration of the block. This overrun occurs when the GPU is running behind and there is not enough room in the secondary ring buffer to hold all of the pending GPU commands that have been enqueued by the CPU.

The most straightforward fix is to increase the size of the secondary ring buffer via D3DRING_BUFFER_PARAMETERS, but eliminating the CPU block may not be worth the increase in memory used. More difficult is to reduce the amount of commands sent to the GPU (such as by eliminating redundantly set state, or by consolidating multiple draw calls).

D3D: Tiling was Used Without Enabling D3D CREATE_ BUFFER_2_FRAMES
D3DTilingEnabled && !D3DBuffer2FramesEnabled Predicated Tiling was used without enabling D3DCREATE_BUFFER_2_FRAMES. Predicated Tiling works best if the GPU can make multiple passes over the command data to render one frame while the CPU is constructing the command data for the next frame. Enable that scenario by specifying D3DCREATE_BUFFER_ 2_FRAMES at CreateDevice time.

D3D: More than Half of the Secondary Ring Buffer was Consumed
D3DTilingEnabled && D3DBuffer2FramesEnabled && (D3DSecondaryRingBufferUsed>D3DSecondaryRingBuffer Size/2)

More than half of the secondary ring buffer was consumed by a single frame while using D3DCREATE_BUFFER_ 2_FRAMES. Predicated Tiling works best if the GPU can make multiple passes over the command data to render one frame while the CPU is constructing the command data for the next frame, and doing so requires enough secondary ring buffer room to hold 2 complete frames of command data. If a single frame consumes more than half of the entire secondary ring buffer (but less than the entire secondary ring buffer), the frame will still be rendered fine but significant CPU and GPU stalls may result.

The most straightforward fix is to increase the size of the secondary ring buffer via D3DRING_BUFFER_PARAMETERS, but eliminating the stalls may not be worth the increase in memory used. Much more is to reduce the amount of commands sent to the GPU (such as by eliminating redundantly set state, or by consolidating multiple draw calls).

D3D: Too Much Time Consumed in D3D Resource Blocks
D3DLockTime>{0.5 ms, 1 ms, 2 ms}

Too much CPU time was consumed in blocking D3D resource locks. Blocks waste CPU time because the CPU spins for the entire duration.

Blocks can be tracked down by doing a PIX Timing Capture, or by using the SetBlockCallback method. Blocks can be eliminated by methods such as double buffering (or triple or n-buffering) dynamic resources, using methods such as BeginVertices, or other mechanisms.

D3D: The System Consumed too Much GPU
(D3DIsGuideVisible && D3DSystemGpuTime>0.333 ms)||
(!D3DIsGuideVisible && D3DSystemGpuTime>1 ms)

The system consumed more GPU time than its reserved amount. Please contact the manufacturer so that the manufacturer can reproduce the problem and fix it.

D3D: The GPU Starved for Data
(D3DPresentInterval !=0) && (D3DIdlesAtKickoff>{0, 0, 0})

The GPU went idle during rendering because it starved for command buffer data from the CPU. Ideally the GPU is never idle, and is always either rendering or waiting for the vertical blank. Use the PIX "Record Timing" ability to determine why the GPU is starving. (Note that you may want to capture 2 frames at once because the idle may occur while transitioning from one frame to the next.)

D3D: The GPU Starved While Waiting for the CPU to End a Bracket
D3DIdlesAtEndBracket>{0, 0, 0}

The GPU went idle while waiting for the CPU to call an End API. None of the GPU command data in a tiling, Z-pass or XPS bracket is submitted to the GPU until EndTiling, EndZPass or XpsEnd is called.

D3D: Too Many Draw Calls
D3DDrawCalls>{3000, 6000, 10000}

There were many more draw calls than are done by most games in a frame. Too many draw calls result in excessive CPU usage while rendering. Consider cutting down on the number of calls (such as by potentially doing better frustum culling or visibility determination), or consolidating draw calls, or using command buffers.

D3D: CPU Frame Time Too Long
D3DCpuFrameTime>{50 ms, 75 ms, 100 ms}

The CPU took too long for a frame (defined as the time between CPU calls to Swap/Present). Use PIX to Record Timing for a frame to determine why.

D3D: CPU Frame Way Too Long
D3DGpuFrameTime>200 ms

The CPU took way too long for a frame (defined as the time between CPU calls to Swap/Present). Cert requirements specify that Swap/Present must always be called within 67 ms. If this is during level load when it is difficult to call Swap/Present at the required rate, consider using the Suspend and Resume methods to have D3D automatically swap for you during the load.

D3D: GPU Frame Time Too Long (D3DIdlesAtKickoff==0) && (D3DGpuFrameTime>{50 ms, 75 ms, 100 ms})

The GPU took too long to render a frame (defined as the time between processing Swaps/Presents). Use PIX to "Record GPU" for a frame to determine why. <<Use 'D3DIdlesAtKickoff==0' so that it rules out GPU stalls caused by the CPU>>

D3D: Not using D3DRS_ PRESENTIMMEDIATETHRESHOLD (D3D PresentImmediate Threshold==0) && (((D3D PresentInterval==1) && (D3DGpuFrameTime>0.016667 ms))|| (D3DPresentInterval==2) && (D3DGpuFrameTime>0.033333 ms)))

The GPU missed its target render time but D3DRS_PRESENTIMMEDIATETHRESHOLD isn't being used. Use this render state to allow frames to be presented immediately when the frame took longer to complete than the target frame rate. This will increase tearing but that's much better than stuttering. We recommend setting D3DRS_PRESENTIMMEDIATETHRESHOLD to 100.

D3D: Too Many GPU Kick-Offs

D3DKickOffs>{100, 200, 500}

There were too many kick-offs of command data to the GPU. This wastes CPU and GPU overhead. Note that the GPU overhead is not reproduced while analyzing a PIX GPU capture. Too many kick-offs might happen because of reasons such as InsertFence being called too often, or because the SegmentCount specified via D3DRING_BUFFER_PARAMETERS is too high relative to the secondary ring buffer size.

Figure 9:
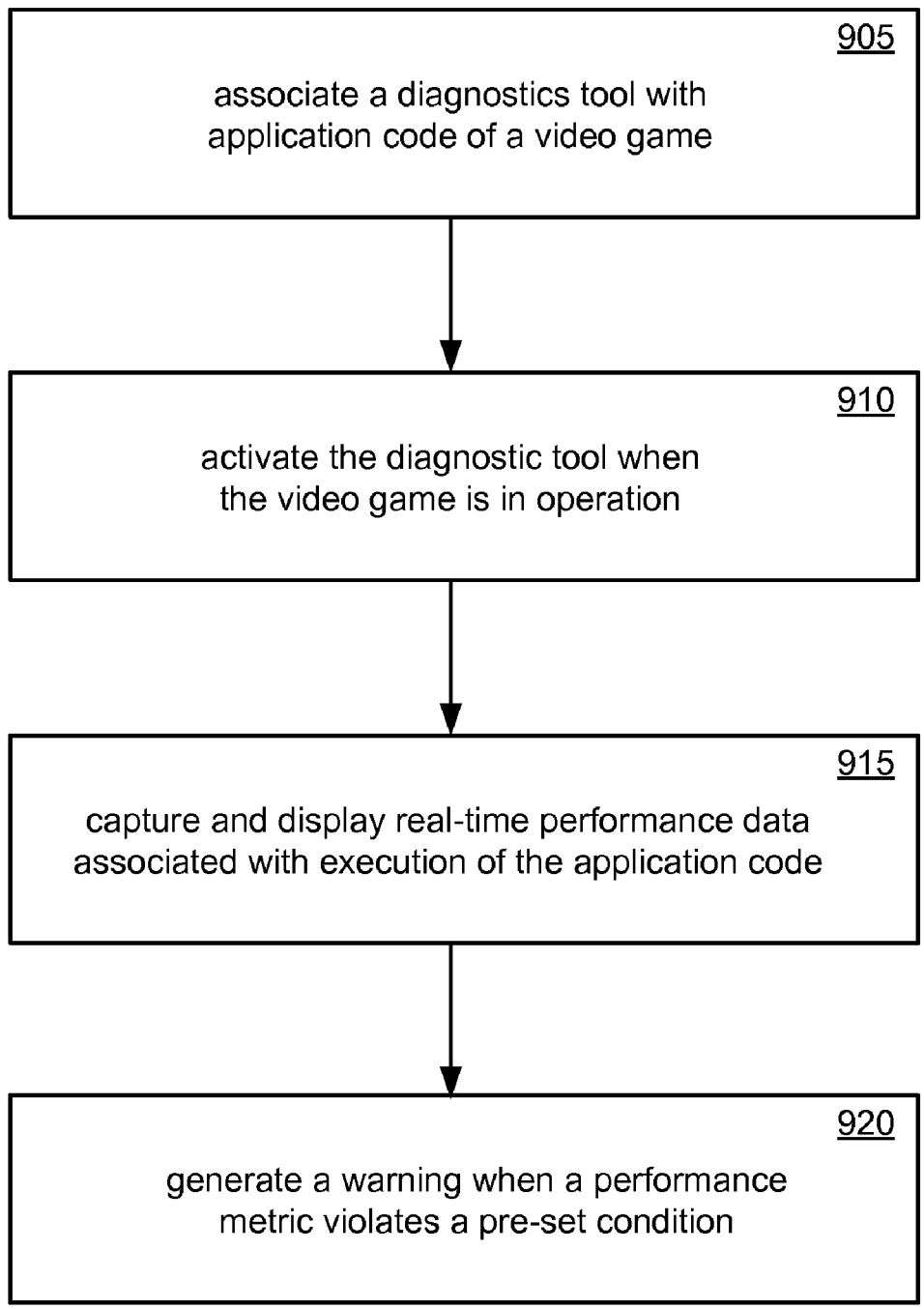
FIG. 9 shows a flow chart of an exemplary method for analyzing the performance of a video game.

FIG. 9 shows a flow chart of a method for analyzing the performance of a video game. In block 905, a diagnostic tool (not shown) of performance analyzer system 100 is associated with application code of the video game. As one among several ways of doing so, an executable code of the diagnostic tool is loaded and installed on a computer that houses and runs the application code of the video game. The loading may be carried out in a manner similar to that done for installing any commercial software, say one that is provided in a CD-ROM for example.

In block 910, the video game is set in operation. The diagnostic tool is activated, either before or during game operation. In block 915, real-time performance data associated with the execution of the application code, is captured and displayed using display screen 105 described above. It can be appreciated that the data capture aspect shown in block 915 typically would not interfere with normal operation of the video game. In block 920, one or more warnings are generated when a performance metric violates a pre-set condition. The warnings and performance metrics associated with interpreting and using display screen 105 have been described above.

Figure 10:
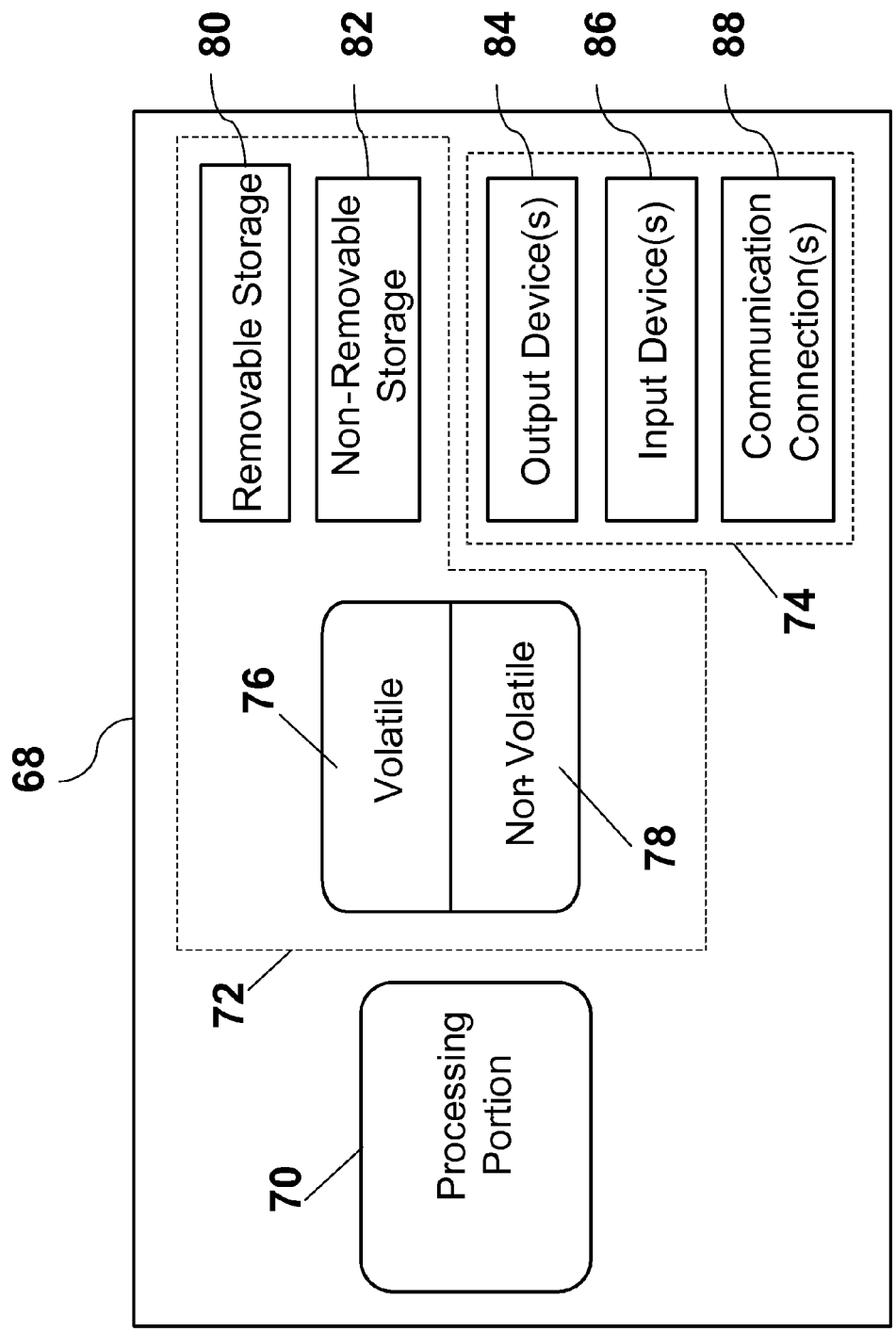
FIG. 10 is a diagram of an exemplary processor for implementing real-time analysis of performance data of a video game.

FIG. 10 is a diagram of an exemplary processor 68 for implementing real-time analysis of performance data of a video game. The processor 68 comprises a processing portion 70, a memory portion 72, and an input/output portion 74. The processing portion 70, memory portion 72, and input/output portion 74 are coupled together (coupling not shown in FIG. 10) to allow communications therebetween. The input/output portion 74 is capable of providing and/or receiving components utilized to perform real-time analysis of performance data of a video game as described above. For example, the input/output portion 74 is capable of accepting a software media on which is stored at least a portion of the diagnostic tool and for displaying the various display screens described above.

The processing portion 70 is capable of implementing real-time analysis of performance data of a video game as described above. For example, the processing portion 70 is capable of generating performance data and the display screens described above.

The processor 68 can be implemented as a client processor and/or a server processor. In a basic configuration, the processor 68 can include at least one processing portion 70 and memory portion 72. The memory portion 72 can store any information utilized in conjunction with real-time analysis of performance data of a video game. Depending upon the exact configuration and type of processor, the memory portion 72 can be volatile (such as RAM) 76, non-volatile (such as ROM, flash memory, etc.) 78, or a combination thereof. The processor 68 can have additional features/functionality. For example, the processor 68 can include additional storage (removable storage 80 and/or non-removable storage 82) including, but not limited to, magnetic or optical disks, tape, flash, smart cards or a combination thereof. Computer storage media, such as memory portion 72, 76, 78, 80, and 82, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 68. Any such computer storage media can be part of the processor 68.

The processor 68 can also contain communications connection(s) 88 that allow the processor 68 to communicate with other devices, such as other devices, for example. Communications connection(s) 88 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 68 also can have input device(s) 86 such as keyboard, mouse, pen, voice input device, touch input device, etc. Output device(s) 84 such as a display, speakers, printer, etc. also can be included.

Figure 11:
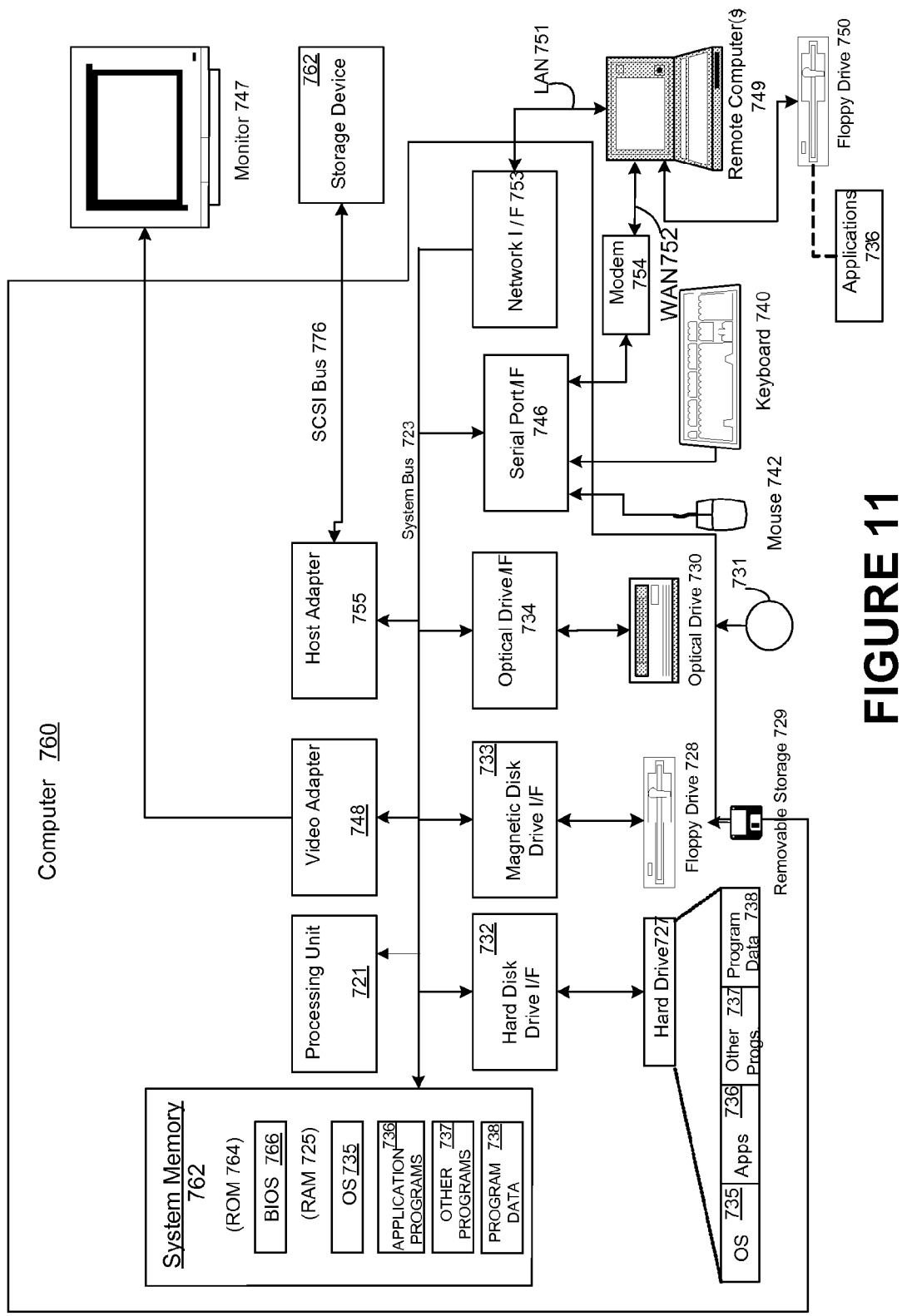
FIG. 11 is a depiction of a suitable computing environment in which real-time analysis of performance data of a video game can be implemented.

FIG. 11 and the following discussion provide a brief general description of a suitable computing environment in which s real-time analysis of performance data of a video game can be implemented. Although not required, various aspects of real-time analysis of performance data of a video game can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of real-time analysis of performance data of a video game can be practiced with other computer system configurations, including hand held devices, multi processor systems, microprocessor based or programmable consumer electronics, network PCs, minicomputers, mainframe computers, and the like. Further, real-time analysis of performance data of a video game also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 721, the memory (both ROM 764 and RAM 725), the basic input/output system (BIOS) 766, and various input/output (I/O) devices such as a keyboard 740, a mouse 742, a monitor 747, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with real-time analysis of performance data of a video game as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn.

The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 11, an exemplary general purpose computing system includes a conventional computing device 760 or the like, including a processing unit 721, a system memory 762, and a system bus 723 that couples various system components including the system memory to the processing unit 721. The system bus 723 may be any of several types of bus structures including a memory bus or memory controller, a peripheral bus, and a local bus using any of a variety of bus architectures. The system memory includes read only memory (ROM) 764 and random access memory (RAM) 725. A basic input/output system 766 (BIOS), containing basic routines that help to transfer information between elements within the computing device 760, such as during start up, is stored in ROM 764. The computing device 760 may further include a hard disk drive 727 for reading from and writing to a hard disk (hard disk not shown), a magnetic disk drive 728 (e.g., floppy drive) for reading from or writing to a removable magnetic disk 729 (e.g., floppy disk, removal storage), and an optical disk drive 730 for reading from or writing to a removable optical disk 731 such as a CD ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer readable media provide non volatile storage of computer readable instructions, data structures, program modules and other data for the computing device 760. Although the exemplary environment described herein employs a hard disk, a removable magnetic disk 729, and a removable optical disk 731, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 729, optical disk 731, ROM 764, or RAM 725, including an operating system 735, one or more application programs 736, other program modules 737, and program data 738. A user may enter commands and information into the computing device 760 through input devices such as a keyboard 740 and pointing device 762 (e.g., mouse). Other input devices (not shown) may include a microphone, joystick, game pad, satellite disk, scanner, or the like. These and other input devices are often connected to the processing unit 721 through a serial port interface 746 that is coupled to the system bus, but may be connected by other interfaces, such as a parallel port, game port, or universal serial bus (USB). A monitor 747 or other type of display device is also connected to the system bus 723 via an interface, such as a video adapter 748. In addition to the monitor 747, computing devices typically include other peripheral output devices (not shown), such as speakers and printers. The exemplary environment of FIG. 11 also includes a host adapter 755, Small Computer System Interface (SCSI) bus 756, and an external storage device 762 connected to the SCSI bus 756.

The computing device 760 may operate in a networked environment using logical connections to one or more remote computers, such as a remote computer 749. The remote computer 749 may be another computing device (e.g., personal computer), a server, a router, a network PC, a peer device, or other common network node, and typically includes many or all of the elements described above relative to the computing device 760, although only a memory storage device 750 (floppy drive) has been illustrated in FIG. 11. The logical connections depicted in FIG. 11 include a local area network (LAN) 751 and a wide area network (WAN) 752. Such networking environments are commonplace in offices, enterprise wide computer networks, intranets and the Internet.

When used in a LAN networking environment, the computing device 760 is connected to the LAN 751 through a network interface or adapter 753. When used in a WAN networking environment, the computing device 760 can include a modem 754 or other means for establishing communications over the wide area network 752, such as the Internet. The modem 754, which may be internal or external, is connected to the system bus 723 via the serial port interface 746. In a networked environment, program modules depicted relative to the computing device 760, or portions thereof, may be stored in the remote memory storage device. It will be appreciated that the network connections shown are exemplary and other means of establishing a communications link between the computers may be used.

While it is envisioned that numerous embodiments of real-time analysis of performance data of a video game are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for real-time analysis of performance data of a video game, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing real-time analysis of performance data of a video game.

The program(s) can be implemented in assembly or machine language, if desired. In any case, the language can be a compiled or interpreted language, and combined with hardware implementations. The methods and apparatuses for implementing real-time analysis of performance data of a video game also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of real-time analysis of performance data of a video game. Additionally, any storage techniques used in connection with real-time analysis of performance data of a video game can invariably be a combination of hardware and software.

While real-time analysis of performance data of a video game has been described in connection with the example embodiments of the various figures, it is to be understood that other similar embodiments can be used or modifications and additions can be made to the described embodiments for performing the same functions of real-time analysis of performance data of a video game without deviating therefrom. Therefore, real-time analysis of performance data of a video game as described herein should not be limited to any single embodiment, but rather should be construed in breadth and scope in accordance with the appended claims.

What is claimed:
1. A method comprising:
associating a diagnostic tool with at least a portion of gaming application code of a video game;
activating the diagnostic tool when the video game is in operation;
capturing and displaying real-time performance data associated with execution of the gaming application code;
generating a warning when a performance metric violates a pre-set condition;
displaying in a system window the real-time performance data in a first graphical format encompassing a plurality of real-time frames corresponding to the video game that is in operation;
displaying in a diagnostics display window a description of the performance metric violation, data statistics related to the performance metric violation, and a first soft-key operable to stop further warnings from being displayed in the diagnostics display window;
displaying in the diagnostic display window a second soft-key operable for displaying in the system monitor display window, a pointer icon pointing to a frame wherein the performance metric violation was encountered; and
displaying a hypertext link that is hyper-linked to a document containing information pertaining to remedying a performance metric violation.

2. The method of claim 1, further comprising displaying, in at least one of the system monitor display window or the diagnostics display window, a third soft-key associated with the frame wherein the performance metric violation was encountered, the third soft-key being operable for displaying a description window comprising a description of the warning and a recommendation for rectifying the performance metric violation.

3. The method of claim 2, wherein the hypertext link is displayed in the description window.

4. The method of claim 1, further comprising displaying, in the diagnostics display window, a priority level associated with the performance metric violation.

5. The method of claim 4, further comprising displaying, in the diagnostics display window, a user interface for defining the preset condition for the performance metric.

6. The method of claim 1, further comprising displaying, in the diagnostics display window, the data statistics in one of a) a relative frame format or b) a relative time of occurrence format.

7. A computer-readable storage medium that is not a transient signal, the computer-readable storage medium having stored thereon computer-readable instructions for performing the steps of:
   capturing real-time performance data when a video game is in operation;
   displaying the real-time performance data in a graphical format encompassing a plurality of real-time frames corresponding to the video game that is in operation;
   displaying a warning when a performance metric violates a pre-set condition, wherein the warning is displayed in a diagnostics display window, the warning comprising a description of the performance metric violation and data statistics related to the performance metric violation;
   displaying a system monitor display window configured to display the real-time performance data;
   displaying a first soft-key in at least one of the system monitor display window or the diagnostics display window, the first soft-key being operable for displaying in the system monitor display window, an indication of a frame wherein the performance metric violation was encountered; and
   displaying a hypertext link that is hyper-linked to a document containing information pertaining to remedying the performance metric violation.

8. The computer-readable storage medium of claim 7, having further stored thereon computer-readable instructions for performing the steps of:
   displaying a second soft-key in at least one of the system monitor display window or the diagnostics display window, the second soft-key being associated with the frame wherein the performance metric violation was encountered, the second soft-key being operable for displaying a description window comprising a recommendation for rectifying the performance metric violation.

9. The computer-readable storage medium of claim 8, wherein the hypertext link is displayed in the description window.

10. A system comprising:
    a processor configured to:
       capture real-time performance data when a video game is in operation; and
       detect a violation of a performance metric; and
    a display unit configured to:
       display the real-time performance data in a graphical format encompassing a plurality of real-time frames corresponding to the video game that is in operation;
       display a warning when a performance metric violates the pre-set condition, wherein the warning is displayed in a diagnostics window, the warning comprising a description of the performance metric violation and data statistics related to the performance metric violation;
       display a system monitor window configured to display the real-time performance data;
       display a first soft-key in at least one of the system monitor window or the diagnostics window, the first soft-key being operable for displaying in the system monitor window, an indication of a frame wherein the performance metric violation was encountered; and
       display a hypertext link that is hyper-linked to a document containing information pertaining to remedying the performance metric violation.

11. The system of claim 10, wherein the display unit is further configured to:
    display a second soft-key in at least one of the system monitor window or the diagnostics window, the second soft-key being associated with the frame wherein the performance metric violation was encountered, the second soft-key being operable for displaying a description window comprising a recommendation for rectifying the performance metric violation.

12. The system of claim 11, wherein the hypertext link is displayed in the description window.

\* \* \* \* \*